(12) United States Patent
Meurer et al.

(10) Patent No.: US 9,103,911 B2
(45) Date of Patent: Aug. 11, 2015

(54) DEVICE FOR RECEIVING SIGNALS WHICH HAVE CARRIER FREQUENCIES AND CODES

(71) Applicant: Deutsches Zentrum fur Luft- und Raumfahrt e.V., Cologne (DE)

(72) Inventors: Michael Meurer, Gilching (DE); Manuel Cuntz, Dachau (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 14/391,603

(22) PCT Filed: Apr. 9, 2013

(86) PCT No.: PCT/EP2013/057386
§ 371 (c)(1),
(2) Date: Oct. 9, 2014

(87) PCT Pub. No.: WO2013/153061
PCT Pub. Date: Oct. 17, 2013

(65) Prior Publication Data
US 2015/0078421 A1    Mar. 19, 2015

(30) Foreign Application Priority Data
Apr. 10, 2012  (DE) .......................... 10 2012 205 817

(51) Int. Cl.
*G01S 19/23* (2010.01)
*H04B 1/7075* (2011.01)
(52) U.S. Cl.
CPC ............ *G01S 19/235* (2013.01); *H04B 1/7075* (2013.01)
(58) Field of Classification Search
CPC .......................... H04B 1/7075; G01S 19/235
USPC .................. 375/142, 144, 145, 148, 149, 150
See application file for complete search history.

(56) References Cited

U.S. PATENT DOCUMENTS

| 6,069,583 A * | 5/2000 | Silvestrin et al. ........ 342/357.27 |
| 2008/0107155 A1 | 5/2008 | Kennedy et al. |
| 2011/0057834 A1 * | 3/2011 | Miller ...................... 342/357.25 |

FOREIGN PATENT DOCUMENTS

WO    2010/136498 A1    12/2010

OTHER PUBLICATIONS

International Search Report for corresponding patent application No. PCT/EP2013/057386 dated Jun. 20, 2013.

*Primary Examiner* — Leon Flores
(74) *Attorney, Agent, or Firm* — Renner, Otto, Boisselle & Sklar, LLP

(57) ABSTRACT

The device for receiving signals which have carrier frequencies and codes, said signals being navigation or communication signals, has multiple individual antennas (114) for receiving a signal, each individual antenna (114) having an antenna output (116) at which the received signal is present. Furthermore, the device is provided with an analog preprocessing unit (122) for preprocessing the signals received by the individual antennas (114), said preprocessing unit (122) having signal transmitting and signal preprocessing channels (124) which are assigned to the individual antennas (114), and the device is provided with a digital signal processor (134). The device additionally has a calibration signal generating unit (148) for generating a calibration signal which, like the signals received by the individual antennas (114), has a carrier frequency and a code and which is used for calibrating the propagation time and the phase of the signal transmission paths. Additionally, a reference frequency generating unit (150) is also provided that generates a reference frequency with which the analog preprocessing unit (122), the digital signal processor (134), and/or the calibration signal generating unit (148) can be operated and/or on the basis of which other operating frequencies with a specifiable relationship to the reference frequency can be generated in order to operate the analog preprocessing unit (122), the digital signal processor (134), and/or the calibration signal generating unit (148).

8 Claims, 3 Drawing Sheets

(State of the Art)

DEVICE FOR RECEIVING SIGNALS WHICH HAVE CARRIER FREQUENCIES AND CODES

The invention relates to a device for receiving signals having carrier frequencies and codes, said signals being navigation or communication signals transmitted particularly by a satellite, wherein, for explaining the state of the art and the invention, reference will be made hereunder to satellite navigation signals and to signal receivers for these signals.

BACKGROUND

In global navigation satellite systems (GNSSs) such as e.g. GPS (Global Positioning System), the receivers detect their geographic position on the basis of received signals which have been transmitted by satellites forming part of a global satellite constellation. The satellites belonging to the GPS satellite constellation will emit their signals on a plurality of carrier frequencies. Each carrier is modulated by at least one pseudo-random binary code frequency PRN (pseudo random noise) which consists of a pseudo-random, periodically repeating sequence of zeros and ones, or of an aperiodic sequence of zeros and ones. The PRN sequences are also referred to as ranging codes because they make it possible to estimate the distances ("ranges") between receiver and satellite. The PRN code sequences used are distinguished in that they have a clear "peak" in the autocorrelation function, which allows for a propagation time measurement.

Each satellite uses its own PRN code sequence, which is why the receiver can assign the received signal to that satellite which transmitted it. The receiver will compute the difference between the point of time that the satellite transmitted the signal—wherein this information is contained in the signal itself—and the point of time that the receiver itself received the signal. On the basis of this difference in time, the receiver will compute its own distance from the satellite. The receiver can compute its own global geographic position by reference to the obtained distances to at least four satellites.

For obtaining the temporal difference between said point of time that the signal is transmitted and said point of time that this signal is received, the receiver will synchronize a locally generated PRN reference code sequence with the PRN code sequence contained in the received signal. In this manner, the receiver will obtain the measure of the temporal deviation of the locally generated PRN reference code sequence in relation to the satellite time and will compute the distance. The synchronization operations include the acquisition of the PRN code sequence of the satellite and its tracking (code tracking). Further, in the receiver, the phase of the carrier which is used by the satellite for emitting the PRN code sequence and the navigation data will normally be tracked (phase tracking).

Presently, a new satellite navigation system bearing the name Galileo is being realized, which offers very high precision and various services. The development of the new Galileo satellite navigation system opens up the possibility of new applications, among them the so-called Safety-of-Life (SoL) services. These services require a special interference resistance with respect to multi-path scattering and interference. A technical solution to this resides in receivers with an antenna array, i.e. a multi-element antenna consisting of a plurality of individual antennas (antenna elements), and a correspondingly designed subsequent signal processing, e.g. adaptive beamforming for well-aimed interference suppression.

For achieving a reliable and precise signal processing, particularly for DOA (Direction of Arrival) estimation and adaptive beamforming (adaptive nulling), it is required that the analog reception signal paths—following the individual antennas of the antenna array—of a preprocessing unit of such a receiver of satellite navigation signals be precisely calibrated in phase and amplitude.

In WO-A-2010/136498, a method and a receiver for the receiving and processing of satellite navigation signals are described. In this known method and receiver, a calibration signal is generated which is configured like the satellite navigation signals, i.e. again comprises a PRN code sequence and a carrier frequency. A block diagram of the known satellite navigation signal receiver is shown in FIG. 1.

Said known receiver 10 comprises an antenna array 12 having a plurality of individual antennas 14 which are arranged in array form and whose antenna outputs 16 are connected to the inputs of (LNA—Low Noise Amplifier) amplifiers 18. The outputs 17 of these amplifiers are connected, via cables 20, to an analog preprocessing unit 22 comprising various signal processing units which in the present context shall not be explained more closely and which are described in greater detail in WO-A-2010/136498. The subject matter of WO-A-2010/136498 is hereby included, by way of reference, in the subject matter of the present application. The analog preprocessing unit 22 comprises a number of signal transmitting and processing channels 24 identical to the number of individual antennas 14. The signal inputs 26 of the analog preprocessing unit 22 are connected via the cables 20 to the outputs of the amplifiers 18. The analog preprocessing unit 22 itself likewise comprises signal outputs 28 which via cable connections 30 are connected to the inputs 32 of a digital signal processor 34. For each channel, the digital signal processor 34 comprises an analog/digital converter 36 and code acquisition as well as code and carrier-frequency tracking units 38 with correlation units 40 and PLL/FLL modules 42,44 which are used for detection of raw data for further processing in a signal processing unit 46. This processing technique is known per se and shall not be explained here in further detail.

In the known satellite navigation signal receiver 10, there is further generated a calibration signal which, like the satellite navigation signals, comprises a PRN code and a carrier frequency. This calibration signal is generated in a calibration signal generating unit 48. The digital signal processor 34 operates at an operating frequency which is generated by a reference frequency generating unit 50. This unit 50 also controls a PLL synthesizer 52 whose output signal is used at 54 for up-mixing the calibration signal so that the calibration signal will have a carrier frequency within the carrier frequency bands of the satellite navigation signals, and further for down-mixing the received satellite navigation signals in the analog preprocessing unit 22 (see at 56).

The reception signals of GNSS systems at the receiver are very weak. The reception power of these signals is in the range of merely a few femto-watts. Thus, however, also the calibration signal generated in the navigation receiver has to be quite weak because otherwise it would "cover" the navigation signals. The calibration signal and the received satellite navigation signals are very vulnerable to intended and unintended interference. However, exactly for DOA estimation and adaptive beamforming, it is desirable that the calibration of the satellite navigation signal receiver is robust toward interference signals. One could increase the robustness of the calibration signal e.g. by using longer codes and correlation times,
increasing the bandwidth of the calibration signal, and/or
increasing the power of the calibration signal.

All of this, however, can be realized only with additional expenditure and/or longer signal processing times (correlation times). Temporal variations of the calibration signal can be tracked only insufficiently. In case of intended interference, these measures are often useless.

SUMMARY OF THE INVENTION

It is an object of the invention to make the calibration of a navigation signal and/or communication signal receiver more robust toward interference signals and to increase the precision.

To achieve the above object, there is proposed, according to the invention, a device for receiving signals having carrier frequencies and codes, said signals being navigation or communication signals, said device comprising a plurality of individual antennas for receiving a signal, each individual antenna having an antenna output at which the received signal is present, an analog preprocessing unit for preprocessing the signals received by the individual antennas, said analog preprocessing unit being connected to the antenna outputs of the individual antennas and including signal transmitting and signal preprocessing channels assigned to the individual antennas, each of said preprocessing channels having a signal input and a signal output, a digital signal processor connected, via signal inputs, to the signal outputs of the signal transmitting and signal preprocessing channels of the preprocessing unit, for further processing of the preprocessed signals for the purpose of code acquisition and of tracking the carrier frequencies and codes of the received signals by estimation of the carrier and code frequencies and of their phases in the digital signal processor, a calibration signal generating unit for generating a calibration signal which, like the signals received by the individual antennas, has a carrier frequency and a code and which, for calibration of the phase and of the propagation time of the signal transmission paths between the antenna outputs of the individual antennas and the signal inputs of the digital signal processor, can be superimposed on the received signals present on the antenna outputs of the individual antennas, wherein a code acquisition for the calibration signal is performed in the digital signal processor, and a reference frequency generating unit generating a reference frequency with which the analog preprocessing unit, the digital signal processor, and/or the calibration signal generating unit can be operated and/or on the basis of which other operating frequencies with a specifiable relationship to the reference frequency can be generated in order to operate the analog preprocessing unit, the digital signal processor, and/or the calibration signal generating unit, wherein the digital signal processor is adapted to have supplied to it a digital signal, particularly a digital sine signal, having the carrier frequency of the calibration signal or having another frequency with a specifiable relationship to the carrier frequency of the calibration signal and wherein said digital signal can be used in the digital signal processor for carrier frequency tracking of the calibration signal as a substitute for the carrier frequency and carrier phase estimation.

Thus, by the invention, it is proposed in a general sense to operate the calibration signal generating unit and the other components of a navigation or communication signal receiver by a common reference frequency. As a result, there will then exist a fixed relationship between the frequency of the generated calibration signal and the calibration signal processed in the receiver and received at the input of the digital signal processor. On the basis of the fixed frequency relationship with respect to the calibration signal, it is now possible to make advantageous use of the circumstance that the exact carrier frequency is known and thus does not have to be estimated anymore by a PLL/FLL (tracking module). This will eliminate errors in the estimation of the carrier frequency and the carrier phase and thus will improve the measurement accuracy. Thus, there must be estimated merely a phase offset—changing only very slowly over time—between the channels, said phase offset being attributed to the cable connections and the analog preprocessing due to possible thermal and mechanical influences.

According to a further advantageous embodiment of the invention, it can be provided that the digital signal processor is further adapted to have supplied to it a code reference signal representing the code of the calibration signal and being generated in the calibration signal generating unit, said code reference signal to be used for code tracking as a substitute for the code frequency and code phase estimation. Thus, in this variant of the invention, an estimation of the code frequency and the code phase in the digital signal processor can be omitted by using, for the code tracking module, a code reference signal which is generated in the calibration signal generating unit.

According to a further advantageous embodiment of the invention, the individual antennas are combined into an antenna array formed as a constructional unit. The components of this antenna array are fixedly connected to each other. This means that a destruction-free demounting will not be possible. The antenna array has a line network integrated into it, serving for incoupling the calibration signal directly at the outputs of the individual antennas.

According to a further advantageous embodiment of the invention, it is provided that the digital signal processor is operative, by evaluation of the calibration signals received via its signal inputs, to determine the phase offsets between the signal transmitting and signal processing channels.

Due to the fixed frequency relationship of the carrier frequency and phase of the generated calibration signal and due to the received calibration signal present at the input of the digital signal processor as provided by the invention, it is possible, as described above, to omit a tracking module. This fixed frequency relationship provided by the invention will also remain if the carrier frequency of the calibration signal is changed. This in turn is of advantage in order to be able to quickly react on interference signals and respectively to prevent disturbances of the calibration or calibration process already beforehand. According to a further embodiment of the invention, it is provided in this regard that the carrier frequency of the calibration signal will be changed discontinuously, i.e. in a jump-like manner, in a random or pseudo-random manner. This can be performed in reaction to the detection of an interference or also prophylactically.

Interfering signals typically have a predetermined spectral characteristic. In case that this characteristic accidentally or intentionally has a high similarity to the spectral characteristic of the signals used for calibration according to the state of the art (which can be e.g. CDMA signals), the calibration process is then considerably degraded or even impossible due to the interfering signal. Thus, in the above described further embodiment of the invention, in order to further increase the robustness of the calibration, there is used no calibration signal which is similar to the received satellite signals or useful signals but, instead, a frequency jump signal is used. The frequency jump calibration signal used according to this further embodiment of the invention will change its spectral characteristic with each frequency jump. Thus, accidental impairment by interfering signals is unlikely or, at the most, only of a short duration (i.e. for the dwelling time between two frequency jumps). Because of the above explained fixed frequency relationship provided according to the invention and the low dynamics of the above mentioned changes of the phase offset (as a result of thermal influences), such short disturbance periods will merely have little effect on the calibration process. The frequency jumps are typically of a pseudo-random nature and thus typically are not predictable for outsiders. As a result, a well-aimed disturbance of a frequency jump calibration signal is possible only in a very difficult way. Further, the method of using a frequency jump signal can be reasonably expanded by spread-band modulation of the frequency jump signal and be further improved in its robustness.

The essential features and advantages of the invention can be briefly summarized as follows:
- synchronization between calibration signal generation and tracking/estimation (by the correlation unit) of the calibration signal,
- omission of PLL/FLL in the tracking module for the calibration signal, and estimation merely of slowly changing phase offsets,
- optional omission of DLL (estimation of code frequency and phase) in the tracking module for the calibration signal,
- frequency jump signal for calibration, optionally with spread-band modulation, thus allowing for a jump-like change of the spectral range used by the calibration signal without interruption of the calibration process,
- optional (pseudo-random) frequency-jump succession and resultant unpredictability with respect to well-aimed interference signals.

The invention is applicable particularly in high-precision geodetic receivers having a plurality of antennas, in military and state-operated navigation receivers and e.g. in navigation receivers for safety-critical services such as e.g. GBAS (Ground Based Augmentation System) or other flight-guidance systems.

BRIEF DESCRIPTION OF THE DRAWINGS

The invention will be explained in greater detail hereunder by way of two embodiments and with reference to the drawing. The individual Figures therein show the following.

DETAILED DESCRIPTION

Figure 1:
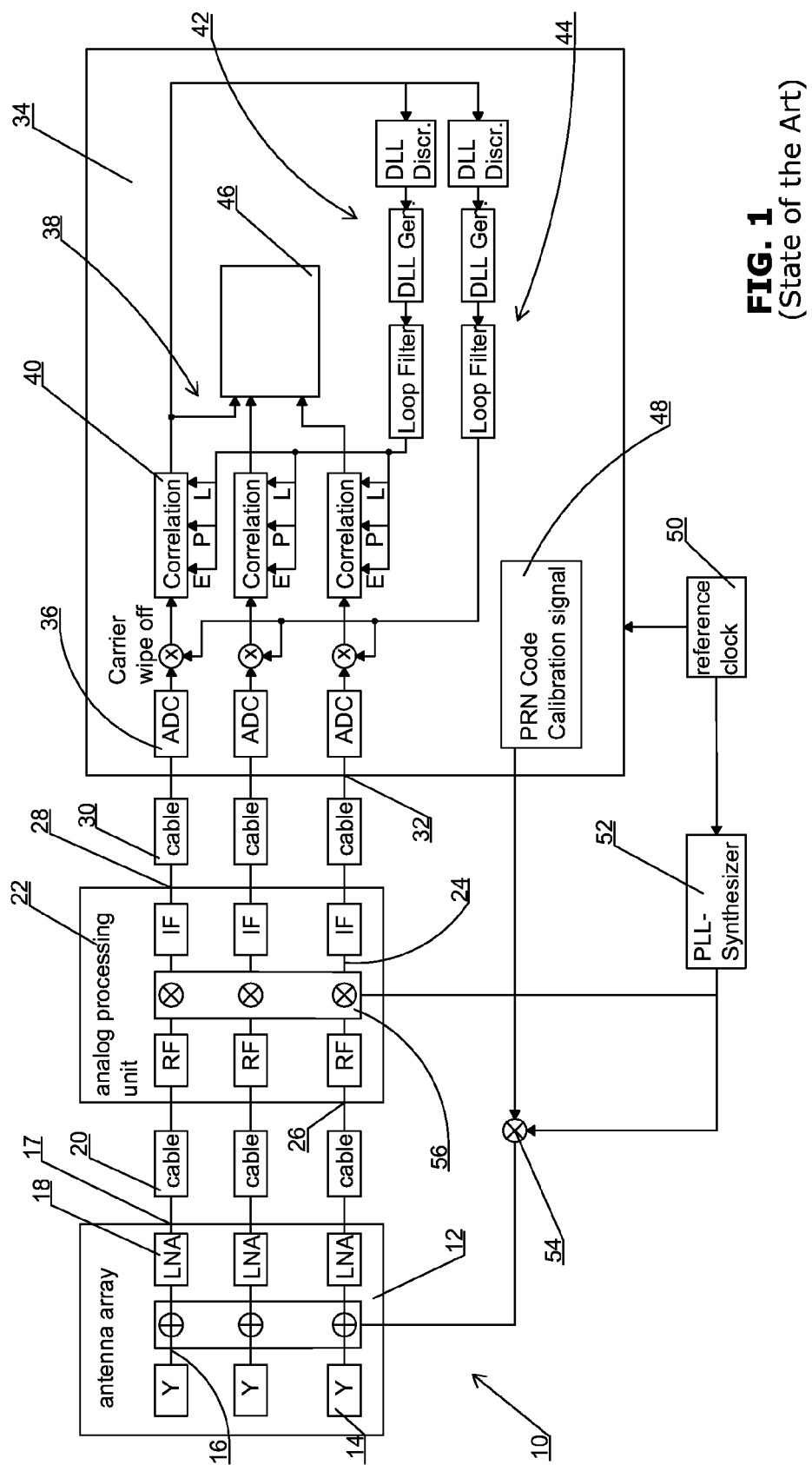
FIG. 1 a block diagram of a known navigation signal receiver.

A block diagram of a known navigation signal receiver is shown in FIG. 1.

The known receiver 100 comprises an antenna array 112 including a plurality of individual antennas 114 arranged in a array form and connected by their antenna outputs 116 to the inputs of (Low Noise Amplifier—LNA) amplifiers 118. The outputs 17 of these amplifiers are connected via cables 120 to an analog preprocessing unit 122 comprising a variety of signal processing units which shall not be further explained in this context and are described in greater detail in WO-A-2010/136498. Said analog preprocessing unit 122 comprises a number of signal transmitting and processing channels 124 identical to the number of individual antennas 114. The signal inputs 126 of the analog preprocessing unit 122 are connected via cables 120 to the outputs 117 of the amplifiers 118. The analog preprocessing unit 122 itself also comprises signal outputs 128 which via cable connections 130 are connected to the inputs 132 of a digital signal processor 134. For each channel, the digital signal processor 134 comprises a digital/analog converter 136 including autocorrelation units 140 used for obtaining raw data for further processing in a signal processing unit 146.

In the navigation signal receiver 100, there is further generated a calibration signal comprising, like the satellite navigation signals, a PRN code and a carrier frequency. This calibration signal is generated in a calibration signal generating unit 148. The digital signal processor operates at an operating frequency generated by a reference frequency generating unit 150. This unit 150 also controls a PLL synthesizer 152 whose output signal is used at 154 for up-mixing the calibration signal so that the calibration signal will have a carrier frequency within the carrier frequency bands of the satellite navigation signals, and further for down-mixing the received satellite navigation signals in the analog preprocessing unit 122 (see at 156).

Figure 2:
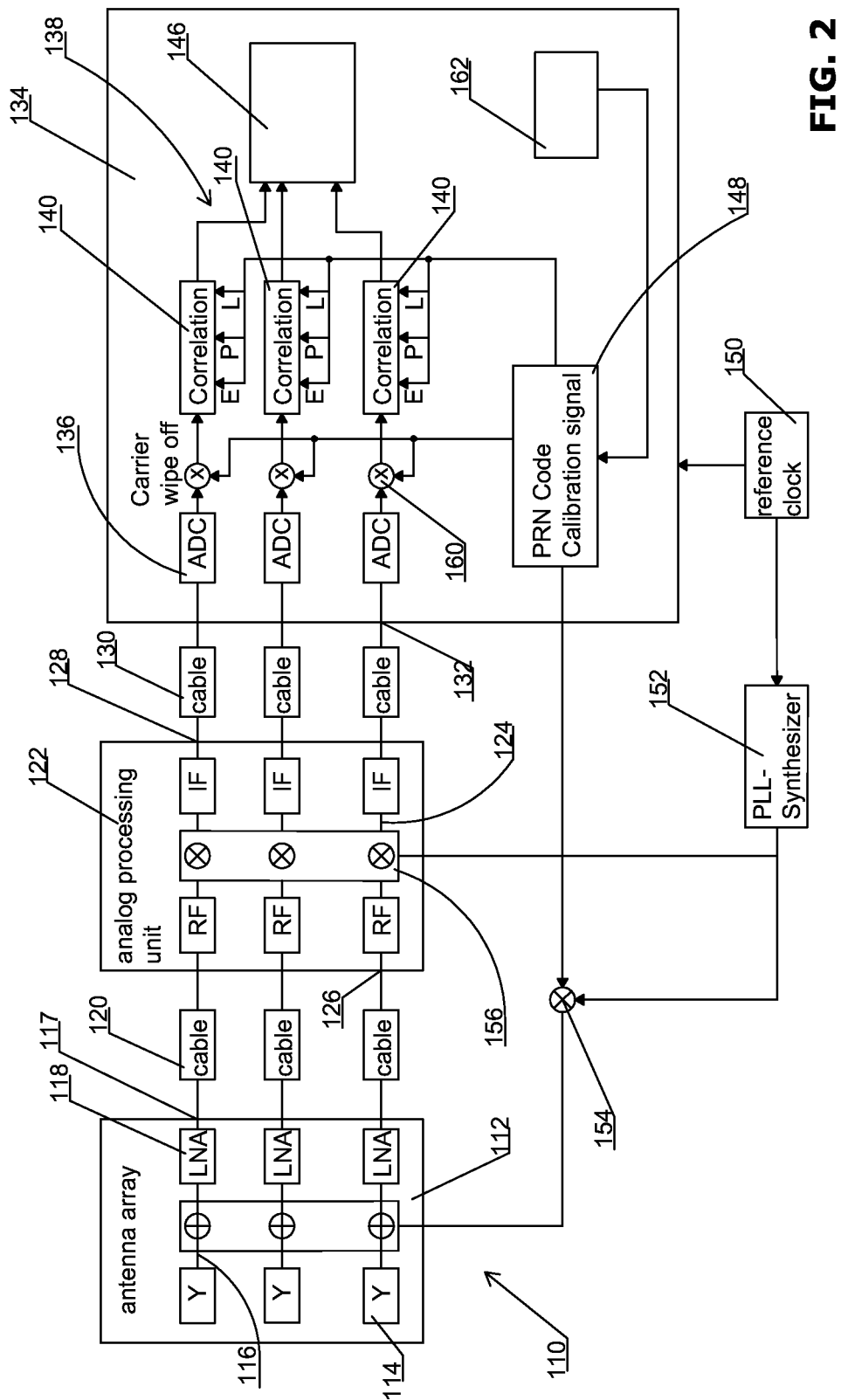
FIG. 2 is a view of a first exemplary embodiment of a block diagram for a navigation signal receiver according to the invention.

The special feature of the navigation signal receiver 100 according to FIG. 2 resides in the omission of the estimation of the carrier frequency and the code as performed for the autocorrelations in the digital signal processor 134. Notably, according to the invention, the characteristics (frequency and code) of the calibration signal generated in the calibration signal generating unit 148 will be used directly in the digital signal processor 134. For this purpose, a sinusoidal signal with a frequency corresponding to the carrier frequency of the calibration signal is used for performing the so-called "carrier wipe-off". This is shown in FIG. 2 at 160. Further, the code of the calibrating signal is supplied, as a reference code, directly to the autocorrelation units 140.

In the block diagram according to FIG. 2, there is further shown, at 162, a frequency jump control unit for the calibration signal generating unit 148. By use of this frequency jump control unit 162, the carrier frequency of the calibration signal can be changed in a random or pseudo-random manner, notably in stages, i.e. discontinuously. This "frequency hopping" is useful as a precaution against interferers or as a reaction on interferers in order to render the calibration process still more robust.

Figure 3:
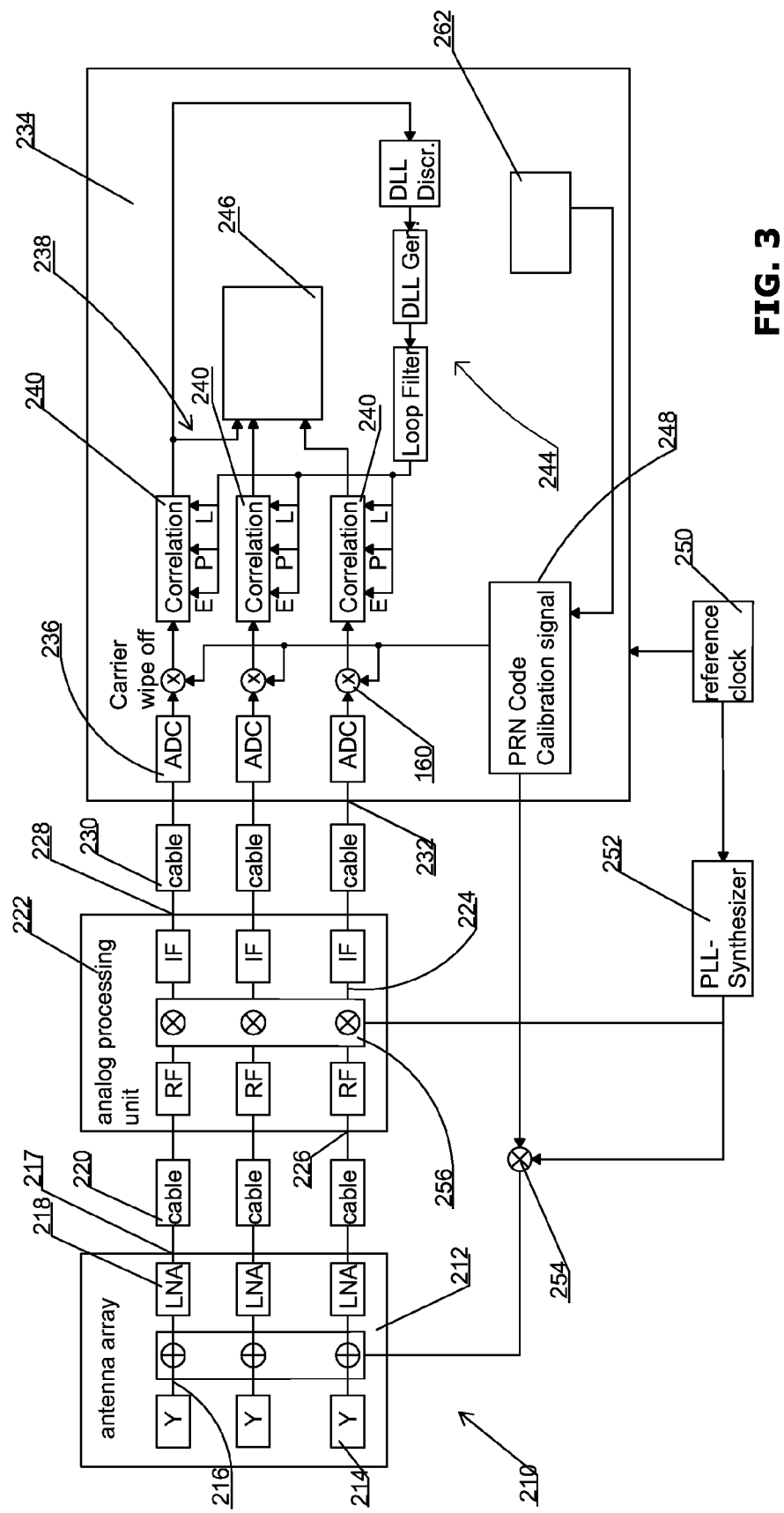
FIG. 3 is a view of a second exemplary embodiment of a block diagram for a navigation signal receiver according to the invention.

FIG. 3 shows a block diagram of a second exemplary embodiment of a navigation signal receiver according to the invention. As far as individual components of the block diagram of FIG. 3 correspond to those of the block diagram in FIG. 2, they are marked by reference numerals corresponding to those in FIG. 2 increased by 100.

The sole difference between the two satellite navigation receivers according to FIGS. 2 and 3 is to be seen in that, in the case depicted in FIG. 3, the code frequency and phase will be estimated with the aid of a DLL module 244 so that, consequently, the digital signal processor 234 requires a tracking module for the code frequency and phase.

The invention has been described hereinabove with reference to satellite navigation signals as an example of the signals for which the receiver of the invention is designed. Generally, due to the similarity between satellite navigation signal and communication signal systems, the invention can also be transferred to communication signal receivers and be applied for such receivers. Also in such receivers, calibration of an antenna array comprising a plurality of individual antennas arranged in array form can be of advantage and, thus, calibration may be required, notably so that received communication signals can be emitted in dependence on their DOA estimation (after signal processing).

The invention claimed is:

1. A device for receiving signals having carrier frequencies and codes, said signals being navigation or communication signals, comprising a plurality of individual antennas for receiving a signal, each individual antenna having an antenna output at which the received signal is present, an analog preprocessing unit for preprocessing the signals received by the individual antennas, said analog preprocessing unit being connected to the antenna outputs of the individual antennas and including signal transmitting and signal preprocessing channels assigned to the individual antennas, each of said signal preprocessing channels having a signal input and a signal output, a digital signal processor connected, via signal inputs, to the signal outputs of the signal transmitting and signal preprocessing channels of the preprocessing unit, for further processing of the preprocessed signals for the purpose of code acquisition and of tracking the carrier frequencies and codes of the received signals by estimation of the carrier and code frequencies and of their phases in the digital signal processor, a calibration signal generating unit for generating a calibration signal which, like the signals received by the individual antennas, has a carrier frequency and a code and which, for calibration of the phase and of the propagation time of the signal transmission paths between the antenna outputs of the individual antennas and the signal inputs of the digital signal processor, can be superimposed on the received signals present on the antenna outputs of the individual antennas, wherein a code acquisition for the calibration signal is performed in the digital signal processor, and a reference frequency generating unit generating a reference frequency with which the analog preprocessing unit, the digital signal processor, and/or the calibration signal generating unit can be operated and/or on the basis of which other operating frequencies with a specifiable relationship to the reference frequency can be generated in order to operate the analog preprocessing unit, the digital signal processor, and/or the calibration signal generating unit, wherein the digital signal processor is adapted to have supplied to it a digital signal having the carrier frequency of the calibration signal or having another frequency with a specifiable relationship to the carrier frequency of the calibration signal and that said digital signal can be used in the digital signal processor for carrier frequency tracking of the calibration signal as a substitute for the carrier frequency and carrier phase estimation.

2. The device according to claim 1, wherein the individual antennas are combined into an antenna array formed as a constructional unit, the components of said antenna array being not detachable in a non-destructive manner and being tightly connected to each other, and that said antenna array comprises an integrated line network for incoupling the calibration signal directly at the outputs of the individual antennas.

3. The device according to claim 1, wherein the digital signal processor is operative, by evaluation of the calibration signals received via its signal inputs, to determine the phase offsets between the signal transmitting and signal processing channels.

4. The device according to claim 1, wherein the digital signal processor is further adapted to have supplied to it a code reference signal representing the code of the calibration signal and generated in the calibration signal generating unit, and that said code reference signal can be used in the digital signal processor for code tracking as a substitute for the code frequency and code phase estimation.

5. The device according to claim 1, wherein in the digital signal processor, a tracking of the code for the calibration signal is performed.

6. The device according to claim 1, wherein the carrier frequency of the calibration signal can be changed discontinuously in a random or pseudo-random manner.

7. The device according to claim 6, wherein upon receipt of interfering signals by the individual antennas, the carrier frequency of the calibration signal can be changed in a well-aimed manner or in a random and respectively pseudo-random manner.

8. The device according to claim 6, wherein the calibration signal is spread-band-modulated.

* * * * *